United States Patent
Catteeuw et al.

(10) Patent No.: US 10,211,882 B2
(45) Date of Patent: Feb. 19, 2019

(54) ENHANCED VECTORING OPERATION WITH SINGLE LOOP UNBUNDLING

(71) Applicant: Alcatel Lucent, Boulogne-Billancourt (FR)

(72) Inventors: Ruben Catteeuw, Antwerp (BE); Geert Ysebaert, Antwerp (BE); Geert Heyninck, Antwerp (BE)

(73) Assignee: ALCATEL LUCENT, Boulogne Billancourt (FR)

( * ) Notice: Subject to any disclaimer, the term of this patent is extended or adjusted under 35 U.S.C. 154(b) by 105 days.

(21) Appl. No.: 15/316,626

(22) PCT Filed: Jun. 26, 2015

(86) PCT No.: PCT/EP2015/064495
§ 371 (c)(1),
(2) Date: Dec. 6, 2016

(87) PCT Pub. No.: WO2016/001076
PCT Pub. Date: Jan. 7, 2016

(65) Prior Publication Data
US 2018/0191399 A1 Jul. 5, 2018

(30) Foreign Application Priority Data
Jul. 3, 2014 (EP) .................................... 14306090

(51) Int. Cl.
*H04B 3/32* (2006.01)
*H04M 11/06* (2006.01)
*H04B 3/487* (2015.01)

(52) U.S. Cl.
CPC ............... *H04B 3/32* (2013.01); *H04B 3/487* (2015.01); *H04M 11/062* (2013.01)

(58) Field of Classification Search
CPC ............................... H04B 3/32; H04M 11/062
(Continued)

(56) References Cited

U.S. PATENT DOCUMENTS

| 8,437,244 B1* | 5/2013 | Cendrillon | H04M 3/002 |
| | | | 370/201 |
| 8,730,785 B2* | 5/2014 | Starr | H04B 3/32 |
| | | | 370/201 |

(Continued)

FOREIGN PATENT DOCUMENTS

| CN | 104221297 A | 12/2014 |
| CN | 104254979 A | 12/2014 |
| WO | WO-2011/070564 A1 | 6/2011 |

OTHER PUBLICATIONS

International Search Report PCT/ISA/210 for International Application No. PCT/EP2015/064495 dated Sep. 11, 2015.
(Continued)

*Primary Examiner* — Gerald Gauthier
(74) *Attorney, Agent, or Firm* — Harness, Dickey & Pierce, P.L.C.

(57) ABSTRACT

In one embodiment the method includes assigning a common frequency range over which first sets of carriers are configured for communication over respective ones of a plurality of subscriber lines. The plurality of subscriber lines are dispatched between a plurality of autonomous vectoring processors configured to mitigate crosstalk between subscriber lines coupled thereto, thereby organizing the plurality of subscriber lines into a plurality of distinct vectoring groups. The method includes assigning a plurality of additional disjoint frequency ranges to respective ones of the plurality of vectoring groups over which second sets of carriers are configured for enhanced communication over respective ones of the plurality of subscriber lines. The second sets of carriers are configured over the respective disjoint frequency ranges assigned to the respective vectoring groups which the respective subscriber lines belong to.

13 Claims, 4 Drawing Sheets

(58) Field of Classification Search
USPC ........ 370/201, 252, 208; 375/220, 222, 224, 375/227, 259, 296, 257; 379/93.08, 379/406.1, 417, 406.06; 714/709
See application file for complete search history.

(56) References Cited

U.S. PATENT DOCUMENTS

| | | | | |
|---|---|---|---|---|
| 9,634,720 | B2* | 4/2017 | Schwager | H04B 3/32 |
| 2002/0178410 | A1* | 11/2002 | Haitsma | G06F 17/30787 |
| | | | | 714/709 |
| 2007/0217329 | A1* | 9/2007 | Abedi | H04L 27/2614 |
| | | | | 370/208 |
| 2009/0060013 | A1* | 3/2009 | Ashikhmin | H04B 3/32 |
| | | | | 375/222 |
| 2009/0225672 | A1* | 9/2009 | Yi | H04L 41/5035 |
| | | | | 370/252 |
| 2010/0034374 | A1* | 2/2010 | Ohman | H04B 3/32 |
| | | | | 379/406.06 |
| 2010/0254444 | A1* | 10/2010 | Clausen | H04L 5/0042 |
| | | | | 375/220 |
| 2011/0080938 | A1* | 4/2011 | Fisher | H04B 3/32 |
| | | | | 375/222 |
| 2011/0103574 | A1* | 5/2011 | Anschutz | H04M 3/34 |
| | | | | 379/406.06 |
| 2011/0110409 | A1* | 5/2011 | Sands | H04B 3/487 |
| | | | | 375/222 |
| 2011/0142111 | A1* | 6/2011 | Sands | H04M 11/062 |
| | | | | 375/222 |
| 2012/0027060 | A1* | 2/2012 | Singh | H04B 3/32 |
| | | | | 375/222 |
| 2012/0057693 | A1* | 3/2012 | Chow | H04B 3/32 |
| | | | | 379/406.1 |
| 2013/0301824 | A1* | 11/2013 | Defoort | H04B 3/32 |
| | | | | 379/406.01 |
| 2014/0023127 | A1* | 1/2014 | Pereira | H04B 3/32 |
| | | | | 375/224 |
| 2014/0105314 | A1* | 4/2014 | Liu | H04B 3/32 |
| | | | | 375/257 |
| 2014/0254791 | A1* | 9/2014 | Wei | H04M 11/062 |
| | | | | 379/406.01 |
| 2015/0009793 | A1* | 1/2015 | Schwager | H04B 3/32 |
| | | | | 370/201 |
| 2015/0195005 | A1* | 7/2015 | De Lind Van Wijngaarden | H04M 3/302 |
| | | | | 370/201 |
| 2015/0381233 | A1* | 12/2015 | Goodson | H04B 3/32 |
| | | | | 379/406.06 |
| 2015/0381309 | A1* | 12/2015 | Goodson | H04M 11/062 |
| | | | | 379/93.08 |

OTHER PUBLICATIONS

Written Opinion of the International Searching Authority PCT/ISA/237 for International Application No. PCT/EP2015/064495 dated Sep. 11, 2015.
Andrea Colmegna et al., "Methods for Supporting Vectoring when Multiple Service Providers Share the Cabinet Area", Apr. 2012, pp. 1-11.
M. Guenach et al., "Vectoring in DLS Systems: Practices and Challenges", Global Telecommunications Conference, 2011, pp. 1-6.
Roberto Gaudino et al., "Unbindling in Optical Access Networks: Focus on Hybrid Fiber-VDSL and TWDM-PON", May 12, 2014, Fontonica AEIT Italian Conference on Photonics Technologies.

* cited by examiner

ENHANCED VECTORING OPERATION WITH SINGLE LOOP UNBUNDLING

CROSS-REFERENCE TO RELATED APPLICATIONS

This application is the U.S. National Phase application of PCT Application No. PCT/EP2015/064495 filed on Jun. 26, 2015, which claims priority to European Patent Application No. 14306090.3 filed on Jul. 3, 2014, the entire contents of each of which are incorporated herein by reference.

TECHNICAL FIELD OF THE INVENTION

The present invention relates to crosstalk mitigation within a wired communication system.

TECHNICAL BACKGROUND OF THE INVENTION

Crosstalk (or inter-channel interference) is a major source of channel impairment for Multiple Input Multiple Output (MIMO) wired communication systems, such as Digital Subscriber Line (DSL) communication systems.

As the demand for higher data rates increases, DSL systems are evolving toward higher frequency bands, wherein crosstalk between neighboring transmission lines (that is to say transmission lines that are in close vicinity over part or whole of their length, such as twisted copper pairs in a cable binder) is more pronounced (the higher frequency, the more coupling).

Different strategies have been developed to mitigate crosstalk and to maximize effective throughput, reach and line stability. These techniques are gradually evolving from static or dynamic spectral management techniques to multi-user signal coordination (vectoring herein after).

One technique for reducing inter-channel interference is joint signal precoding: the transmit data symbols are jointly passed through a precoder before being transmitted over the respective communication channels. The precoder is such that the concatenation of the precoder and the communication channels results in little or no inter-channel interference at the receivers.

A further technique for reducing inter-channel interference is joint signal post-processing: the receive data symbols are jointly passed through a postcoder before being detected. The postcoder is such that the concatenation of the communication channels and the postcoder results in little or no inter-channel interference at the receivers.

More formally, a vectored system can be described by the following linear model:

$$Y(k)=H(k)X(k)+Z(k) \qquad (1),$$

wherein the N-component complex vector X, respectively Y, denotes a discrete frequency representation, as a function of the carrier index k, of the symbols transmitted over, respectively received from, the N vectored channels,
wherein the N×N complex matrix H is referred to as the channel matrix: the (n,m)-th component $H_{nm}$ of the channel matrix H describes how the communication system produces a signal on the n-th channel output in response to a signal being transmitted to the m-th channel input; the diagonal elements of the channel matrix describe direct channel coupling, and the off-diagonal elements of the channel matrix (also referred to as the crosstalk coefficients) describe inter-channel coupling,
and wherein the N-component complex vector Z denotes additive noise over the N channels, such as Radio Frequency Interference (RFI) or thermal noise.

Linear signal precoding and post-processing are advantageously implemented by means of matrix products.

In downstream, the linear precoder performs a matrix-product in the frequency domain of a transmit vector U(k) with a precoding matrix P(k), i.e. X(k)=P(k)U(k) in eq. (1), the precoding matrix P(k) being such that the overall channel matrix H(k)P(k) is diagonalized, meaning the off-diagonal coefficients of the overall channel H(k)P(k), and thus the inter-channel interference, reduce to almost zero.

Practically, and as a first order approximation, the precoder superimposes anti-phase crosstalk pre-compensation signals over the victim line along with the direct signal that destructively interfere at the receiver with the actual crosstalk signals from the respective disturber lines.

In upstream, the linear postcoder performs a matrix-product in the frequency domain of the receive vector Y(k) with a crosstalk cancellation matrix Q(k) to recover the transmit vector U(k) (after channel equalization and power normalization), the crosstalk cancellation matrix Q(k) being such that the overall channel matrix Q(k)H(k) is diagonalized, meaning the off-diagonal coefficients of the overall channel Q(k)H(k), and thus the inter-channel interference, reduce to almost zero.

Signal vectoring is typically performed within an access node, wherein all the data symbols concurrently transmitted over, or received from, all the subscriber lines are available. For instance, signal vectoring is advantageously performed within a Digital Subscriber Line Access Multiplexer (DSLAM) deployed at a Central Office (CO) or as a fiber-fed remote unit closer to subscriber premises (street cabinet, pole cabinet, etc). Signal precoding is particularly appropriate for downstream communication (toward customer premises), while signal post-processing is particularly appropriate for upstream communication (from customer premises).

The choice of the vectoring group, that is to say the set of communication lines, the signals of which are jointly processed, is rather critical for achieving good crosstalk mitigation performances. Within a vectoring group, each communication line is considered as a disturber line inducing crosstalk into the other communication lines of the group, and the same communication line is considered as a victim line receiving crosstalk from the other communication lines of the group. Crosstalk from lines that do not belong to the vectoring group is treated as alien noise and is not canceled.

Ideally, the vectoring group should match the whole set of communication lines that physically and noticeably interact with each other. Yet, legal or technical restrictions may prevent such an exhaustive approach, in which case the vectoring group would include a sub-set only of all the physically interacting lines, thereby yielding limited vectoring gains.

For instance, regulators in certain countries require to have Sub-Loop Unbundling (SLU), whereby a new telecommunication provider company known as a Competitive Local Exchange Carrier (CLEC) gets granted a physical access to the copper plant, and is allowed to install its own network equipment alongside the network equipment of the Incumbent Local Exchange Carrier (ILEC). In this deployment model, the lines of different operators typically share the same cable or cable binder. As the lines are connected to different network equipment that are not coordinated, the resulting vectoring gains are reduced and can be as low as 5 to 10% depending on the crosstalk levels of the "alien" disturbers.

In some countries, SLU has been omitted in case of vectoring deployments. Instead the ILEC or any designated operator supplies an access to the subscriber's individual Layer 2 (L2) or Layer 3 (L3) bit streams at one or more central aggregation points. The other operators connect to the aggregation points and pick up the relevant bit streams from their respective subscribers.

A second option could be to enable "cross-DSLAM" vectoring while allowing operators to use their own equipment suppliers. Although, this could be feasible from a theoretical and technical point of view, it means that non-standard vectoring interfaces and algorithms need to be agreed upon between competitors, which makes the solution practically infeasible.

SUMMARY OF THE INVENTION

It is an object of the present invention to improve vectoring performances in case of SLU.

In accordance with a first aspect of the invention, a method for managing transmission resources used for communication over a plurality of mutually-interfering subscriber lines comprises assigning a common frequency range over which first sets of carriers are configured for communication over respective ones of the plurality of subscriber lines. The plurality of subscriber lines are dispatched between a plurality of autonomous vectoring processors configured to mitigate crosstalk between subscriber lines coupled thereto, thereby organizing the plurality of subscriber lines into a plurality of distinct vectoring groups. The method further comprises assigning a plurality of additional disjoint frequency ranges to respective ones of the plurality of vectoring groups over which second sets of carriers are configured for enhanced communication over respective ones of the plurality of subscriber lines. The second sets of carriers are configured over the respective disjoint frequency ranges assigned to the respective vectoring groups which the respective subscriber lines belong to.

In accordance with another aspect of the invention, a network manager for managing transmission resources used for communication over a plurality of mutually-interfering subscriber lines is configured to assign a common frequency range over which first sets of carriers are configured for communication over respective ones of the plurality of subscriber lines. The plurality of subscriber lines are dispatched between a plurality of autonomous vectoring processors configured to mitigate crosstalk between subscriber lines coupled thereto, thereby organizing the plurality of subscriber lines into a plurality of distinct vectoring groups. The network manager is further configured to assign a plurality of additional disjoint frequency ranges to respective ones of the plurality of vectoring groups over which second sets of carriers are configured for enhanced communication over respective ones of the plurality of subscriber lines. The second sets of carriers are configured over the respective disjoint frequency ranges assigned to the respective vectoring groups which the respective subscriber lines belong to.

In accordance with still another aspect of the invention, a transceiver is configured to operate a communication channel over a subscriber line with a first and a second set of carriers configured as per the above method.

Such a transceiver may form part of an access node that supports wired communication from/to subscriber devices over a copper plant, such as a DSLAM, an Ethernet switch, an edge router, etc, and deployed at a co or as a fiber-fed remote unit closer to subscriber premises (street cabinet, pole cabinet, etc).

Such a transceiver may also form part of a subscriber device that supports wired communication over a subscriber line, such as a modem, a gateway, a personal computer, etc.

In one embodiment of the invention, the disjoint frequency ranges are determined based upon a fairness criteria between the plurality of vectoring groups.

In one embodiment of the invention, the fairness criteria aims at balancing bit rates achievable over respective ones of the plurality of subscriber lines.

In one embodiment of the invention, the fairness criteria aims at guaranteeing a minimum bit rate achievable over respective ones of the plurality of subscriber lines.

In one embodiment of the invention, the disjoint frequency ranges are situated above the common frequency range.

In one embodiment of the invention, the disjoint frequency ranges individually comprise two or more non-adjacent frequency intervals.

In one embodiment of the invention, the disjoint frequency ranges are defined by disjoint spectral masking of a further common frequency range.

In one embodiment of the invention, crosstalk mitigation between the plurality of subscriber lines belonging to the same vectoring group is restricted to the second sets of carriers.

In one embodiment of the invention, the plurality of subscriber lines are Digital Subscriber Line DSL lines.

Embodiments of a method according to the invention correspond with the embodiments of a network manager according to the invention, and with the embodiments of a transceiver according to the invention.

The present invention proposes to use Frequency Division Duplexing (FDD) technique over an extended frequency range based upon the vectoring topology, that is to say the association between the subscriber lines and the respective vectoring groups. The extended frequency range is divided into non-overlapping frequency bands, and each disjoint frequency band (or a set thereof) is assigned to different vectoring groups controlled by different operators (and thus not coordinated between each other). Per frequency band, only the lines of one operator are active, allowing optimal vectoring gains in that band.

The extended frequency range is preferably chosen above a shared frequency range that is used for nominal communication. For instance one may use the additional frequency range spanning from 17.6 to 30 or 34 MHz situated above the VDSL2 17a profile.

BRIEF DESCRIPTION OF THE DRAWINGS

The above and other objects and features of the invention will become more apparent and the invention itself will be best understood by referring to the following description of an embodiment taken in conjunction with the accompanying drawings wherein.

DETAILED DESCRIPTION OF THE INVENTION

Figure 1:
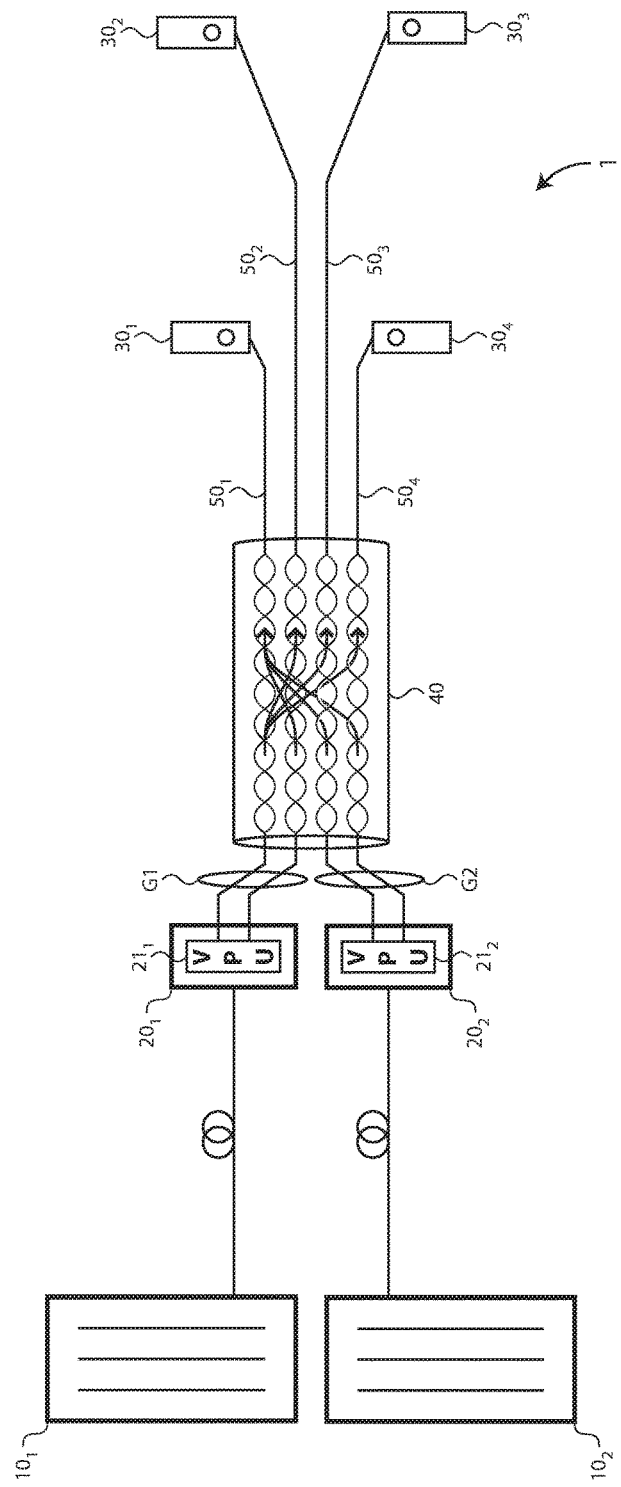
FIG. 1 represents an overview of an access plant with SLU.

There is seen in FIG. 1 an access plant 1 with SLU. The access plant comprises two access nodes installed and controlled by two different operators. Typically, the two access nodes 20 share a common location, such as at a CO, or within a shared or co-located cabinet. The access nodes 20 are coupled via one or more optical fibers to respective network units 10, and further coupled via respective subscriber lines 50 to Customer Premises Equipment (CPE) 30 at various subscriber premises.

The subscriber lines 50 coupled to the two access nodes 20 are bundled all together within a common binder or cable 40, and thus induce crosstalk into each other, and next run through dedicated loop segments for final connection to the subscriber premises. The transmission media is typically composed of copper Unshielded Twisted Pairs (UTP).

The access nodes 20 individually comprise one or more vectoring processor units 21 (or VPU) for jointly processing the data symbols that are being transmitted over, or received from, the subscriber lines 50 in order to mitigate the crosstalk induced within the common access segment 40 and to increase the communication data rates achievable over the respective subscriber lines 50.

Yet, the VPUs 21 operate autonomously from each other and thus only cancel crosstalk between their own respective subscriber lines. Crosstalk induced by the subscriber lines coupled to other access nodes is not canceled and is treated as alien noise. For instance, the crosstalk induced by the subscriber lines 503 and 504 into the subscriber lines 501 and 502 is not canceled by the VPU 211; in the opposite way, the crosstalk induced by the subscriber lines 501 and 502 into the subscriber lines 503 and 504 is not canceled by the VPU 212. The subscriber lines 50 are thus organized into two distinct vectoring groups G1 and G2. Consequently, the vectoring gains are limited and hardly exceed 5 to 10%.

Figure 2:
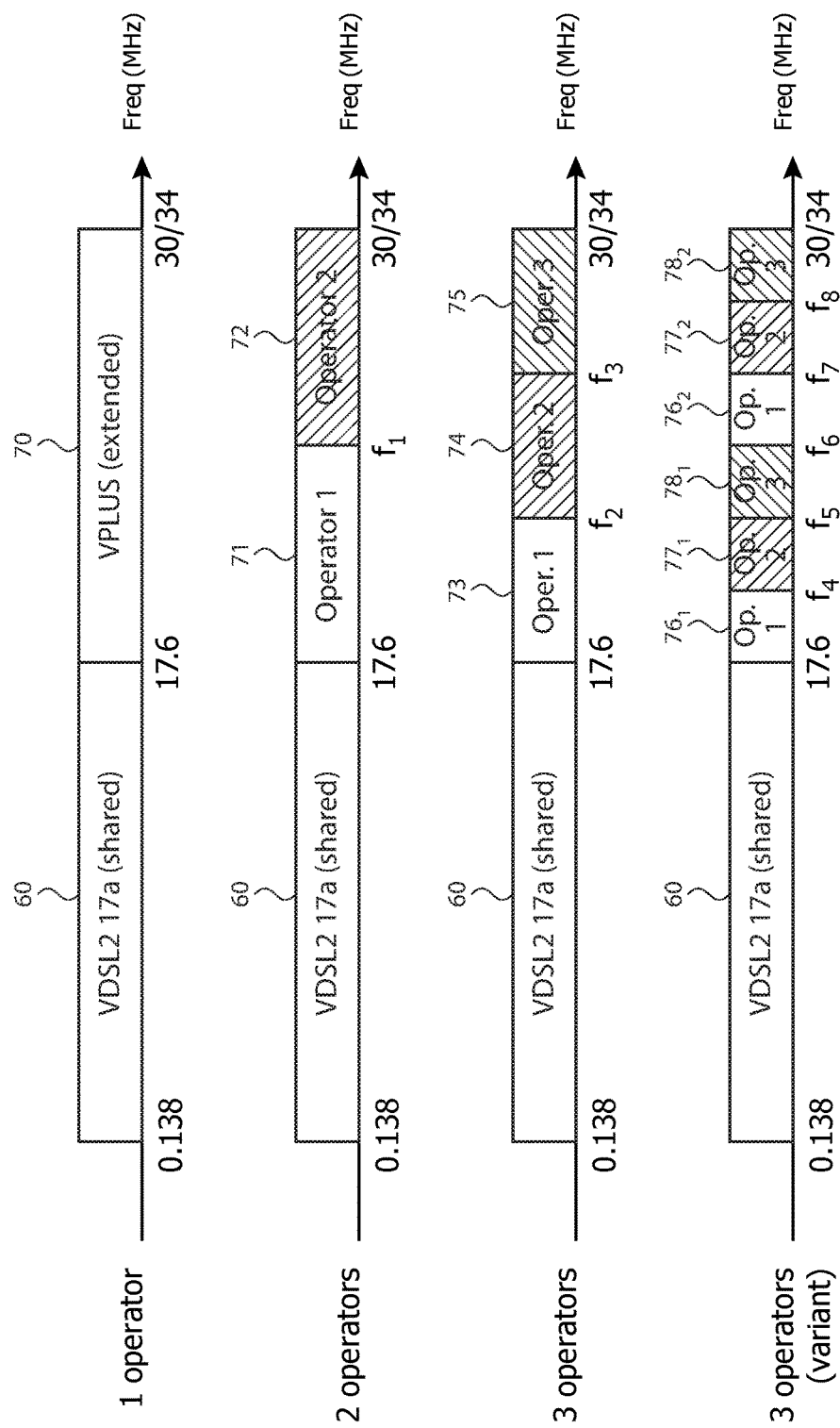
FIG. 2 represents frequency allocation schemes as per the present invention.

There is seen in FIG. 2 several frequency allocation schemes as per the present invention that aim at improving the vectoring performance in case of SLU.

As an illustrative embodiment, all the subscriber lines are VDSL2 lines initially operated with a nominal frequency range 60 that spans from 25 kHz or 138 kHz up to 17.6 MHz and corresponding to VDSL2 17a profile. The nominal frequency range is then extended with a frequency range 70 (or VPLUS) spanning from 17.6 MHz up to 30 or 34 MHz. The frequency ranges 60 and 70 include frequency sub-bands assigned to the respective downstream and upstream directions (not shown).

While the frequency range 60 is shared between various operators, making vectoring operation into that band sub-optimal as aforementioned, the extended frequency range 70 is split into disjoint frequency bands individually assigned to the respective operators (see frequency bands 71 to 78 in FIG. 2), and beyond to the respective vectoring groups managed by these operators. In this way, vectoring operation over the extended frequency range 70 is optimal as only lines of one operator are expected to transmit at any given carrier frequency.

The non-overlapping frequency bands are defined by respective split frequencies (see frequencies f1 to f8 in FIG. 2). The number of split frequencies depends on the number of operators that needs to be served as well as on the frequency allocation scheme that is used.

The split frequencies can be pre-determined (e.g., country-wide definition by the national regulator); or a different split-frequencies can be configured per cabinet location.

The split frequencies do not necessarily divide the extended frequency range 70 into equal-length intervals, but rather can be adjusted by an external software tool to make the best compromise among all the operators present in the binder. For instance, the split frequencies can be determined to give equal fairness towards all the operators for as much loop lengths as possible, or alternatively to give equal fairness for achieving a minimum guaranteed bit rate towards all the operators (e.g., all operators should be able to achieve 70 Mbps up for a given maximal loop length).

It is noteworthy that interleaving the respective frequency bands assigned to the respective operators, such as depicted in the bottom plot of FIG. 2 (variant scheme with 3 operators), improves the fairness among the operators.

Figure 3:
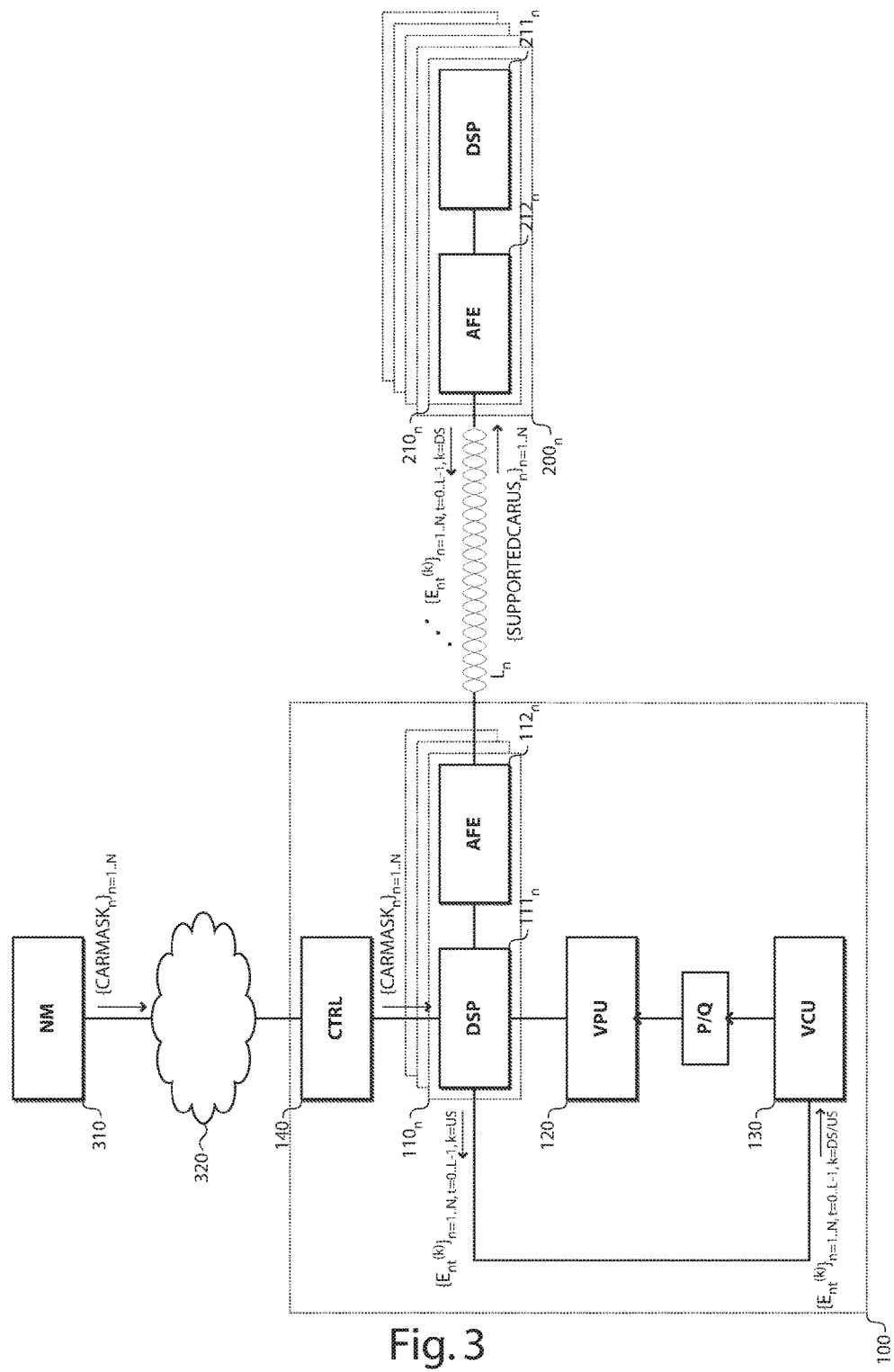
FIG. 3 represents further details about an access node.

There is seen in FIG. 3 greater details about an access 100 and CPEs 200 configured to operate as per the present invention. The access node 100 is coupled to N CPEs $200_1$ to $200_N$ through N respective subscriber lines $L_1$ to $L_N$, which are assumed to form part of one given vectoring group.

The access node 100 comprises:
- N transceivers 1101 to 110N;
- a VPU 120;
- a Vectoring Control Unit 130 (or VCU) for controlling the operation of the VPU 120; and
- a communication controller 140 (or CTRL).

The CPEs 200 individually comprise a transceiver 210.

The transceivers 110 are individually coupled to the VPU 120, to the VCU 130, to the communication controller 140, and to the remote transceivers 210 via the subscriber lines $L_1$ to $L_N$. The VCU 130 is further coupled to the VPU 120. The communication controller 140 is further coupled through a data communication network 320 to a network manager 310 (or NM).

The communication controller 140 configures the communication parameters used by the transceivers 110 and 210 over the subscriber lines $L_1$ to $L_N$. The communication controller 140 operates under the administrative control of the network manager 310.

More specifically, the network manager 310 determines the frequency ranges that shall be used for communication over the subscriber lines $L_1$ to $L_N$. The network manager 310 determines a first nominal frequency range that is used by all operators and corresponding for instance to the VDSL2 17a frequency range 60 spanning from 138 Khz up to 17.6 MHz, and a a second extended frequency range for dedicated use by one operator only. The second frequency range is a subset of the extended frequency range 70 spanning from 17.6 MHz up to 30 or 34 MHz.

The network manager 310 can tailor the second frequency range based upon channel measurements performed over the subscriber lines $L_1$ to $L_N$ by the transceivers 110 and 210 so as to best fit a particular network deployment. The channel measurements may for instance refer to signal to Noise Ratio (SNR) measurements, path loss measurements or loop length measurements.

The first frequency and second frequency ranges are defined by means of a carrier mask CARMASK. CARMASK is a Management Information Base (MIB) parameter whose value is controlled by the network manager 310 (see $\{CARMASK_n\}_{n=1 \ldots N}$ in FIG. 3). CARMASK parameter comprises a list of allowable frequency intervals, each defined as a start-frequency index followed by an end-frequency index. No transmission is allowed outside those intervals, meaning the gain of the carriers whose index is outside those intervals is set to zero. The gains of the remaining carriers is set according to a pre-determined Power Spectral Density (PSD) mask applicable to a particular network deployment.

Such a spectral masking allows different operators to use non-overlapping frequency bands defined from a common extended frequency band.

The communication controller 140 passes CARMASK parameters to the respective transceivers 110. The transceivers 110 configure the set of supported carriers in downstream and upstream directions from the band plan, which defines the respective downstream and upstream communication bands for a given transmission profile, taking due account of the restrictions imposed by CARMASK parameter. The upstream carrier set is then communicated to the remote transceiver 210 during initialization (see $\{SUPPORTEDCARUS_n\}_{n=1 \ldots N}$ in FIG. 3).

The transceivers 110 and 210 respectively comprise:
a Digital Signal Processor (DSP) 111; and
an Analog Front End (AFE) 112.

The AFEs 112 and 212 individually comprise a Digital-to-Analog Converter (DAC) and an Analog-to-Digital Converter (ADC), a line driver for amplifying the transmit signal and for driving the transmission line, and a Low Noise Amplifier (LNA) for amplifying the receive signal with as little noise as possible.

The AFE 112 and 212 further comprises a transmit filter and a receive filter for confining the signal energy within the appropriate communication frequency bands while rejecting out-of-band interference. The transmit and receive filters are designed according to a pre-determined frequency range comprising both the shared and extended frequency range over which the transceivers 110 and 210 are expected to operate.

In case of Frequency Division Duplexing (FDD) operation where downstream and upstream communications operate simultaneously over the same transmission medium in distinct and non-overlapping frequency bands, the AFEs 112 and 212 further comprise a hybrid for coupling the transmitter output to the transmission medium and the transmission medium to the receiver input while achieving low transmitter-receiver coupling ratio. The AFE may further accommodate echo cancellation filters to reduce the coupling ratio at a further extent.

In case of Time Duplexing Division (TDD) operation where downstream and upstream communications operate over the same frequency band but in distinct and non-overlapping time slots, the hybrid can be advantageously omitted as the transmitter and receiver operate in alternate mode: the receive circuitry is switched OFF (or the receive signal is discarded) while the transmit circuitry is active, and the way around, the transmit circuitry is switched OFF while the receive circuitry is active.

The AFEs 112 and 212 further comprise impedance-matching circuitry for adapting to the characteristic impedance of the transmission line, clipping circuitry for clipping any voltage or current surge occurring over the transmission line, and isolation circuitry (e.g., a transformer) for DC-isolating the transceiver from the transmission line.

The DSPs 111 and 211 are configured to operate downstream and upstream communication channels for conveying user traffic over the respective transmission lines.

The DSPs 111 and 211 are further configured to operate downstream and upstream control channels that are used to transport control traffic, such as diagnosis or management commands and responses. Control traffic is multiplexed with user traffic over the transmission medium.

More specifically, the DSPs 111 and 211 are for encoding and modulating user and control data into digital data symbols, and for de-modulating and decoding user and control data from digital data symbols.

The following transmit steps are typically performed within the DSPs 111 and 211:
data encoding, such as data multiplexing, framing, scrambling, error correction encoding and interleaving;
signal modulation, comprising the steps of ordering the carriers according to a carrier ordering table, parsing the encoded bit stream according to the bit loadings of the ordered carriers, and mapping each chunk of bits onto an appropriate transmit constellation point (with respective carrier amplitude and phase), possibly with Trellis coding;
signal scaling;
Inverse Fast Fourier Transform (IFFT);
cyclic Prefix (CP) insertion; and possibly
time-windowing.

The following receive steps are typically performed within the DSPs 111 and 211:
CP removal, and possibly time-windowing;
Fast Fourier Transform (FFT);
Frequency EQualization (FEQ);
signal de-modulation and detection, comprising the steps of applying to each and every equalized frequency sample an appropriate constellation grid, the pattern of which depends on the respective carrier bit loading, detecting the expected transmit constellation point and the corresponding transmit bit sequence, possibly with Trellis decoding, and re-ordering all the detected chunks of bits according to the carrier ordering table; and
data decoding, such as data de-interleaving, error correction, de-scrambling, frame delineation and de-multiplexing.

Some of these transmit or receive steps can be omitted, or some additional steps can be present, depending on the exact digital communication technology being used.

The DSPs 111 are further configured to supply transmit frequency samples to the VPU 120 before Inverse Fast Fourier Transform (IFFT) step for joint signal precoding, and to supply receive frequency samples to the VPU 120 after Fast Fourier Transform (FFT) step for joint signal post-processing.

The DSPs 111 are further configured to receive corrected frequency samples from the VPU 120 for further transmission or detection. Alternatively, the DSPs 111 may receive correction samples to add to the initial frequency samples before further transmission or detection.

The VPU 120 is configured to mitigate the crosstalk induced over the transmission lines. This is achieved by multiplying a vector of transmit frequency samples U with a precoding matrix P so as to pre-compensate an estimate of the expected crosstalk (downstream), or by multiplying a vector of receive frequency samples Y with a crosstalk cancellation matrix Q so as to post-compensate an estimate of the incurred crosstalk (upstream).

In the matrix P or Q, a row n represents a particular victim line $L_n$, while a column m represents a particular disturber line $L_m$. At the intersection, the coupling coefficient that should be applied to the corresponding disturber transmit or receive frequency sample for mitigating over the victim line $L_n$ the crosstalk from the disturber line $L_m$.

Only the lines connected to the access node 100 appears in the precoding matrix P or in the crosstalk cancellation matrix Q. The lines connected to another access node and sharing a common binder with the lines $L_1$ to $L_N$ are not handled by the VPU 120, and thus their interference are not mitigated.

It is to be further noticed that the VPU 120 can perform vectoring on both the nominal and extended frequency ranges with partial and full vectoring gains respectively, or can focus the vectoring resources on the extended frequency range only.

The VCU 130 is basically for controlling the operation of the VPU 120, and more specifically for estimating and tracking the crosstalk coefficients between the transmission lines of the vectoring group, and for initializing and updating the coefficients of the precoding matrix P and of the crosstalk cancellation matrix Q from the so-estimated crosstalk coefficients.

The VCU 130 starts first by configuring the respective downstream pilot sequences for use by the transceivers 110 for downstream crosstalk estimation, and the upstream pilot sequences for use by the transceivers 210 for upstream crosstalk estimation. The pilot sequences actively assigned to the subscriber lines $L_1$ to $L_N$ are denoted as $\{V_{nt}\}_{n=1 \ldots N, t=0 \ldots T-1}$, and are chosen from a set of mutually orthogonal pilot sequences. The length of the pilot sequences is denoted as T, and is typically greater than the number N of subscriber lines.

The VCU 130 gathers respective slicer errors $\{E_{nt}\}_{n=1 \ldots N, t=0 \ldots T-1}$ as measured during the detection of the pilot digits by the remote transceivers 210 for downstream communication, and by the local transceivers 110 for upstream communication (see $\{E_{nt}\}_{n=1 \ldots n, t=0 \ldots T-1, k=DS}$ and $\{E_{nt}\}_{n=1 \ldots n, t=0 \ldots T-1, k=US}$ in FIG. 3, wherein K=DS and K=US denote the set of downstream and upstream pilot carriers respectively).

The VCU 130 correlates a sequence of T successive error samples $\{E_{nt}\}_{t=0 \ldots T-1}$ on a given victim line $L_n$ with the pilot sequence $\{V_{mt}\}_{t=0 \ldots T-1}$ transmitted over a respective disturber line $L_m$ in order to estimate the nominal or residual crosstalk coefficients from the disturber line $L_m$ into the victim line $L_n$ (after some power normalization).

The VCU 130 next determines the coefficients of the precoding matrix P and of the crosstalk cancellation matrix Q from the so-estimated crosstalk coefficients by means of techniques such as matrix inversion (first or second order inversion, full inversion), additive or multiplicative matrix updates, etc.

Figure 4:
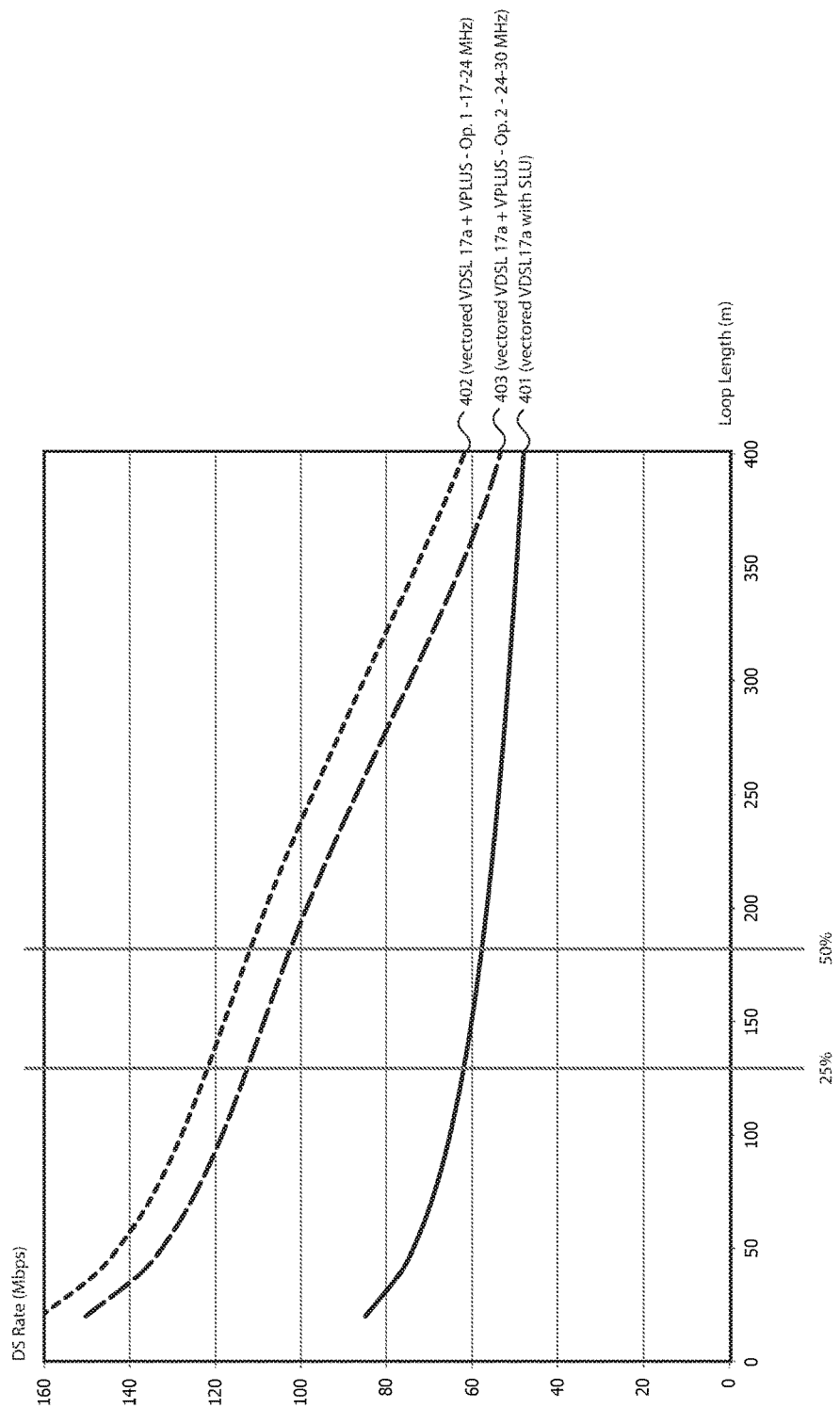
FIG. 4 represents bit rates achievable with the present invention for various loop lengths.

There is seen in FIG. 4 a plot with the expected downstream bit rates plotted versus the applicable loop length. The loop lengths corresponding to the 25 and 50 distribution centiles (meaning that 25% and 50% of the total number of subscribers are expected to have a loop length lower than or equal to the mentioned values) have been plotted as two vertical lines.

The curve 401 corresponds to the use of the nominal VDSL 17a frequency range only, assuming a total of 48 mutually-interfering lines organized into two distinct vectoring groups of 24 subscriber lines operated by two distinct operators Op. 1 and Op. 2.

The curve 402 and 403 corresponds to the use of both the VDSL 17a frequency range along with an extended frequency range VPLUS spanning from 17.6 MHz up to 30 MHz. The VPLUS frequency range is split into two equal frequency bands assigned to the first and second operators. The first frequency band spans from 17.6 MHz up to 24 MHz and is assigned to the operator Op. 1; the second frequency band spans from 24 MHz up to 30 MHz and is assigned to the second operator Op. 2.

As one can see, almost 60% of all subscribers can achieve 100 Mbps as minimum guaranteed bit rate. Also, the bit rates achievable by the first operator Op. 1 (curve 402) are higher than the bit rates achievable by the second operator Op. 2 (curve 403) as the first operator Op. 1 uses a lower frequency band incurring a lower path loss. Hence, one can move the 24 MHz split point downwards so as to have more fairness among the operators Op. 1 and Op. 2 and get the curves 402 and 403 closer to each other.

It is to be noticed that the term 'comprising' should not be interpreted as being restricted to the means listed thereafter. Thus, the scope of the expression 'a device comprising means A and B' should not be limited to devices consisting only of components A and B. It means that with respect to the present invention, the relevant components of the device are A and B.

It is to be further noticed that the term 'coupled' should not be interpreted as being restricted to direct connections only. Thus, the scope of the expression 'a device A coupled to a device B' should not be limited to devices or systems wherein an output of device A is directly connected to an input of device B, and/or vice-versa. It means that there exists a path between an output of A and an input of B, and/or vice-versa, which may be a path including other devices or means.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, a processor should not be construed to refer exclusively to hardware capable of executing software, and may implicitly include, without limitation, digital signal processor (DSP) hardware, network processor, application specific integrated circuit (ASIC), field programmable gate array (FPGA), etc. Other hardware, conventional and/or custom, such as read only memory (ROM), random access memory (RAM), and non volatile storage, may also be included.

The invention claimed is:

1. A method for managing transmission resources used for communication over a plurality of mutually-interfering subscriber lines, and comprising assigning a common frequency range over which first sets of carriers are configured for communication over the respective ones of the plurality of subscriber lines,
   wherein the plurality of subscriber lines are dispatched between a plurality of autonomous vectoring processors configured to mitigate crosstalk between subscriber lines coupled thereto, thereby organizing the plurality of subscriber lines into a plurality of distinct vectoring groups, and wherein the method further comprises assigning a plurality of additional disjoint frequency ranges to respective ones of the plurality of vectoring groups over which second sets of carriers are configured for enhanced communication over respective ones of the plurality of subscriber lines, the second sets of carriers being configured over the respective disjoint frequency ranges assigned to the respective vectoring groups which the respective subscriber lines belong to.

2. A method according to claim 1, wherein the disjoint frequency ranges are determined based upon a fairness criteria between the plurality of vectoring groups.

3. A method according to claim 2, wherein the fairness criteria aims at balancing bit rates achievable over respective ones of the plurality of subscriber lines.

4. A method according to claim 2, wherein the fairness criteria aims at guaranteeing a minimum bit rate achievable over respective ones of the plurality of subscriber lines.

5. A method according to claim 1, wherein the disjoint frequency ranges are situated above the common frequency range.

6. A method according to claim 1, wherein the disjoint frequency ranges individually comprise two or more non-adjacent frequency intervals.

7. A method according to claim 1, wherein the disjoint frequency ranges are defined by disjoint spectral masking of a further common frequency range.

8. A method according to claim 1, wherein crosstalk mitigation between the plurality of subscriber lines belonging to the same vectoring group is restricted to the second sets of carriers.

9. A method according to claim 1, wherein the plurality of subscriber lines are Digital Subscriber Line DSL lines.

10. A transceiver configured to operate a communication channel over a subscriber line with a first and a second set of carriers configured as per a method according to claim 1.

11. An access node comprising a transceiver according to claim 10.

12. A subscriber equipment comprising a transceiver according to claim 10.

13. A network manager for managing transmission resources used for communication over a plurality of mutually-interfering subscriber lines, and configured to assign a common frequency range over which first sets of carriers are configured for communication over respective ones of the plurality of subscriber lines,
wherein the plurality of subscriber lines are dispatched between a plurality of autonomous vectoring processors configured to mitigate crosstalk between subscriber lines coupled thereto, thereby organizing the plurality of subscriber lines into a plurality of distinct vectoring groups,
and wherein the network manager is further configured to assign a plurality of additional disjoint frequency ranges to respective ones of the plurality of vectoring groups over which second sets of carriers are configured for enhanced communication over respective ones of the plurality of subscriber lines, the second sets of carriers being configured over the respective disjoint frequency ranges assigned to the respective vectoring groups which the respective subscriber lines belong to.

* * * * *